United States Patent [19]

Hergenrother et al.

[11] Patent Number: 4,820,791

[45] Date of Patent: Apr. 11, 1989

[54] POLYIMIDES CONTAINING CARBONYL AND ETHER CONNECTING GROUPS

[75] Inventors: Paul M. Hergenrother, Yorktown; Stephen J. Havens, Newport News, both of Va.

[73] Assignee: United States of America, Washington, D.C.

[21] Appl. No.: 11,093

[22] Filed: Feb. 5, 1987

[51] Int. Cl.⁴ .................. C08G 8/02; C08G 14/00
[52] U.S. Cl. .................... 528/125; 528/128; 528/172; 528/185; 528/353
[58] Field of Search ........... 528/125, 172, 128, 185, 528/353

[56] References Cited

U.S. PATENT DOCUMENTS

| | | | |
|---|---|---|---|
| 3,502,762 | 3/1970 | Heller | 264/204 |
| 3,835,120 | 9/1974 | Bach et al. | 524/128 |
| 4,299,750 | 11/1981 | Antonoplos et al. | 524/602 |
| 4,316,844 | 2/1982 | Waitkus et al. | 528/125 |
| 4,405,770 | 9/1983 | Schoenberg et al. | 526/259 |
| 4,525,171 | 5/1985 | Bakshi et al. | 524/376 |

Primary Examiner—John Kight
Assistant Examiner—M. L. Moore
Attorney, Agent, or Firm—George E. Helfrich

[57] ABSTRACT

New polyimides have been prepared from the reaction of aromatic dianhydrides with novel aromatic diamines containing carbonyl and ether connecting groups between the aromatic rings. Several of these polyimides were shown to be semi-crystalline as evidenced by wide angle x-ray diffraction and differential scanning calorimetry. Most of the semi-crystalline polyimides form tough solvent resistant films with high tensile properties. One of these materials exhibits very high fracture toughness and can be thermally processed.

3 Claims, No Drawings

POLYIMIDES CONTAINING CARBONYL AND ETHER CONNECTING GROUPS

ORIGIN OF THE INVENTION

The invention described herein was made by employees of the United States Government and may be manufactured and used by or for the Government for governmental purposes without the payment of any royalties thereon or therefor.

TECHNICAL FIELD OF THE INVENTION

This invention relates to structural resins and in particular to new polyimides formed from the reaction of aromatic dianhydrides with novel aromatic diamines containing carbonyl and ether connecting groups between the aromatic rings whereby processible, high strength, solvent, chemical and impact-resistant polyimides are obtained.

BACKGROUND OF THE INVENTION

Polyimides are condensation polymers commonly synthesized by the reaction of aromatic dianhydrides with aromatic diamines. The intermediate poly(amic acid) is either thermally or chemically cyclodehydrated to form the polyimide which has a repeat unit of the general type

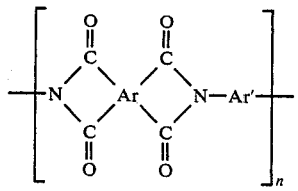

Ar is a tetravalent aromatic radical which can be as simple as 1,2,4,5-tetrasubstituted benzene. Ar may be a bis-4-(o-diphenylene) having the general structure

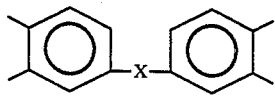

where X=nil, O, S, $SO_2$, C=O, $Si(CH_3)_2$, etc., or Ar may be any other appropriate tetravalent radical. Ar' is a divalent aromatic radical which may be 1,3-phenylene, 1,4-phenylene, 4,4'-biphenylene, 4,4'-oxydiphenylene, 4,4'-thiodiphenylene, 4,4'-carbonyldiphenylene, 4,4'-methanediphenylene, or any other appropriate divalent radical.

Synthesis and characterization of polyimides has been extensively reported in the literature. The preparation of aromatic polyimides by reaction of an aromatic dianhydride with an aromatic diamine, followed by thermal cyclization was first reported in 1963 [G. M. Bower and L. W. Frost, *Journal of Polymer Science A1*, 3135 (1963)]. Several reviews on polyimides have been published [C. E. Sroog, "Polyimides" in *Encyclopedia of Polymer Science and Technology*, (H. F. Mark, N. G. Gaylord, and N. M. Bikales, Ed.), Interscience Publishers, New York, 1969, Vol. 11, pp. 247-272; N. A. Adrova, M. I. Bessonov, L. A. Lauis, and A. P. Rudakov, *Polyimides*, Technomic Publishing Co., Inc., Stamford, Conn., 1970].

Wholly aromatic polyimides are known for their exceptional thermal, thermooxidative and chemical resistance. Several polyimides such as Kapton ® (Dupont), PI-2080 (Upjohn), XU-218 (Ciba-Gigy), ULTEM ® (General Electric) and LARC-TPI (Mitsui-Toatsu) are commercially available and used as films, moldings, adhesives, and composite matrices. As a class of materials, aromatic linear polyimides are generally considered to be amorphous. However, there are numerous examples of polyimides which display crystallinity (Adrova, op. cit., pp. 136-144; T. L. St. Clair and A. K. St. Clair, *Journal of Polymer Science, Polymer Chemistry Edition*, 15, 1529 (1977)). Kapton ®, a commercially available polyimide film, has been shown to exhibit molecular aggregation or superstructure (S. Isoda, H. Shimoda, M. Kochi and H. Kambe, *Journal of Polymer Science, Polymer Physics Edition*, 19, 1293 (1981); S. Isoda, M. Kochi, and H. Kambe, Ibid., 20, 837 (1982)). Kapton ® and the other reported semi-crystalline polyimides exhibit exceptional thermal stability and resistance to solvents while under stress, but cannot be easily thermoformed into useful molded objects or composites.

The introduction of crystallinity into a polymer has long been recognized as an effective means of improving the solvent resistance and increasing the modulus. In addition, if the proper degree and type of crystallinity is attained, the material can also display extremely high toughness. A notable example is polyetheretherketone (PEEK ®) (Imperial Chemicals Industries) which exhibits a very high fracture toughness ($C_{Ic}$, critical strain energy release rate) and is highly solvent resistant. PEEK ® can also be thermally processed into moldings and composites. The carbonyl and ether connecting groups between the aromatic rings in PEEK ® tend to be so stereochemically similar that the tendency toward crystalline order is greatly enhanced (T. E. Atwood, P. C. Dawson, J. L. Freeman, L. R. J. Hoy, J. B. Rose and P. A. Staniland, *Polymer*, 22, 1096 (1981)).

It would be advantageous to extend this unique relationship between carbonyl and ether linkages to other classes of polymers, particularly to polyimides. Polyimides are more easily prepared and isolated than PEEK ®. Additionally, special technology is required for impregnating PEEK ® into fibers due to the insolubility of PEEK ® in common solvents. The poly(amic acid) precursor to polyimides is usually soluble in the reaction mixture and is applied as a solution to fibers or fabric. In this manner good impregnation or "wetting" of the fibers is obtained before thermal cyclodehydration to form an insoluble polyimide. An alternate method involving melt impregnation with the polyimide is also envisioned.

The ratio of carbonyl to ether linkages is critical toward achieving the goal of thermally processable semi-crystalline polyimides. The carbonyl and ether linkages could be incorporated into either the Ar (dianhydride) or the Ar' (diamine) portion of the polyimide repeat unit. However, experience has shown that the diamine portion is easier to modify, resulting in fewer steps than required for the synthesis of new dianhydrides. Novel diamines containing varying rations of carbonyl to ether groups would still have to be synthesized from commercially available materials.

The present invention is a new composition of matter and concerns new polyimides and novel monomers and the process for preparing same.

Another object of the present invention is to provide new polyimides that are useful as adhesives, coatings, films, membranes, and composite matrices.

Another object of the present invention is the synthesis of five new monomers:

1,3-bis(4-aminophenoxy4'-benzoyl)benzene;
1,4-bis(4-aminophenoxy-4-benzoyl)benzene;
4,4'-bis(4-aminophenoxy-4'-benzoyl)bensophenone;
4,4'-bis(4-aminophenoxy-4'-benzoyl)diphenyl ether; and
2,6-bis(4-aminophenoxy-4'-benzoyl)naphthalene.

SUMMARY OF THE INVENTION

According to the present invention, the foregoing and additional objects were obtained by synthesizing polyimides from the reaction of aromatic dianhydrides with the five new diamines, which contain carbonyl and ether connecting groups between the aromatic rings. Several of these polyimides were shown to be semi-crystalline as evidenced by wide angle x-ray diffraction and differential scanning calorimetry. Glass transition temperatures ranged between 192° and 247° C. and crystalline melt temperatures were observed between 350° and 442° C. Solution cast films of several of the polyimides were tough and flexible. Tensile strengths, tensile moduli, and elongations at break ranged between 14,500 to 19,400 psi, 386,000 to 523,000 psi, and 3.26 to 39.47%, respectively, at 25° C. Mechanical properties at 177° C. and 232° C. were also good. The polyimide from the reaction of 3,3',4,4'-benzophenonetetracarboxylic acid dianhydride and 1,3-bis(4-aminophenoxy-4'-benzoyl)benzene provided a solvent resistant semi-crystalline material which could be molded at 400° C. Fracture toughness ($G_{Ic}$) was exceptionally high, 37.8 in lb/in². In addition, the degree of crystallinity of this polyimide could be altered by either quenching from a temperature above its crystalline melt temperature (350° C.) or annealing at a temperature slightly below its crystalline melt temperature.

DETAILED DESCRIPTION OF THE INVENTION

The general reaction sequence for the synthesis of the novel diamines is represented by the following equations:

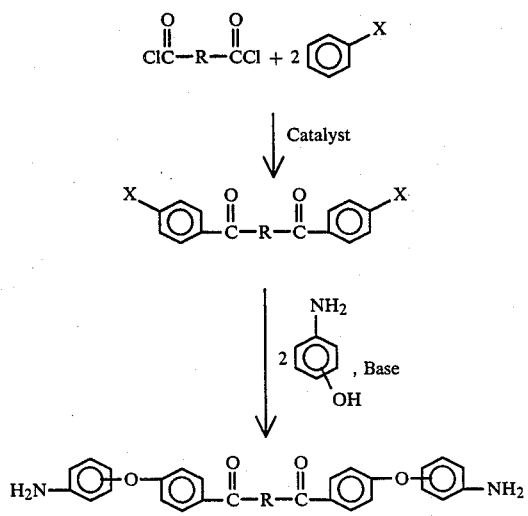

where: R is selected from a group of aromatic radicals consisting of:

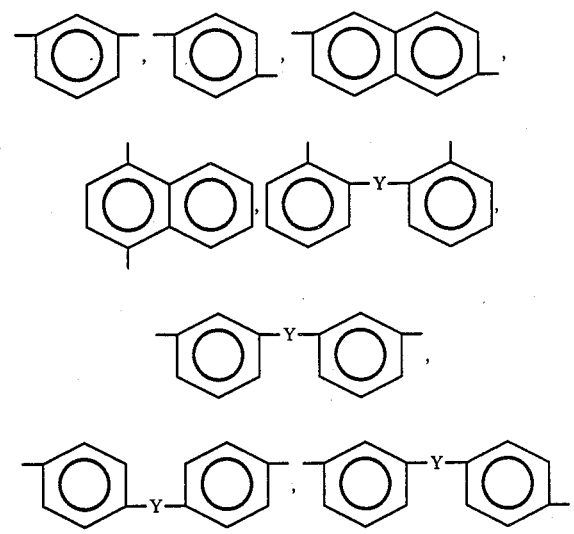

Y=nil, O, S,

$SO_2$, $CH_2$, $C(CH_3)_2$, $C(CF_3)_2$, $Si(CH_3)_2$ and mixtures thereof.

X is either a fluorine or chlorine atom. The catalyst is a Lewis Acid which is preferably $AlCl_3$, but may be $AlBr_3$, $FeCl_3$, $SnCl_4$, $BCl_3$, $BF_3$ and the like.

The base is an alkali metal hydroxide or carbonate selected from NaOH, KOH, $Na_2CO_3$, $K_2CO_3$ and the like.

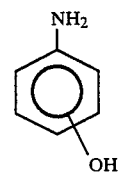

represents either 3-aminophenol or 4-aminophenol. Other aminophenols can also be used such as

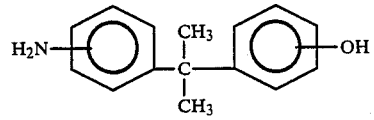

where the $NH_2$ and OH groups may be in the 3 or 4 position.

Therefore Ar' is equivalent to

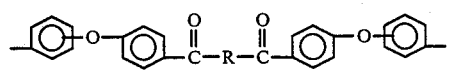

in the following general equation for the synthesis of new polyimides:

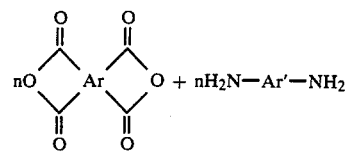

↓ Solvent

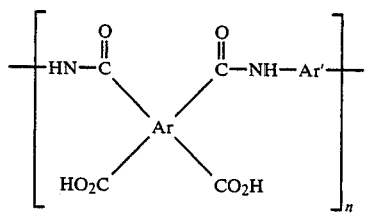

Cyclodehydration ↓ $-2nH_2O$

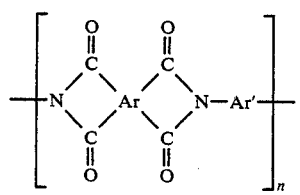

where: n is an integer from 4–100 repeat units. The solvent is preferably N,N-dimethylacetamide, but may be other solvents such as N,N-dimethylformamide, dimethyl sulfoxide, N-methylpyrrolidinone, m-cresol, or ether solvents such as diglyme.

Cyclodehydration is accomplished chemically or by heating the intermediate poly(amic acid) at temperatures exceeding 150° C.

Ar is selected from a group of radicals consisting of

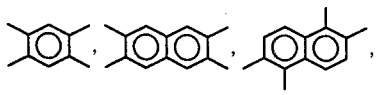

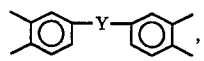

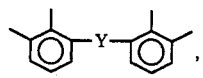

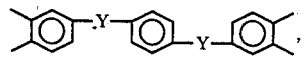

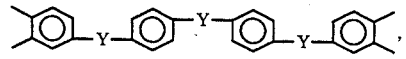

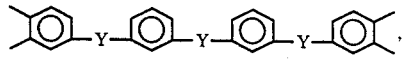

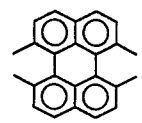

Y=nil, O, S,

$SO_2$, $CH_2$, $C(CH_3)_2$, $C(CF_3)_2$, $Si(CH_3)_2$ and mixtures thereof.

The following example illustrates the reaction sequence for the synthesis of the polyimide in the case where Ar is

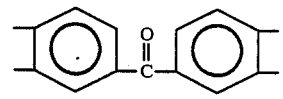

and Ar' is

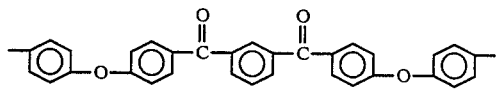

The invention is not limited to this example.

EXAMPLES

Monomer Synthesis (A) 1,3-Bis(4-fluorobenzoyl)benzene: Anhydrous aluminum chloride (160.0 g, 1.20 mol) was added to a stirred solution of isophthaloyl chloride (101.5 g, 0.50 mol) dissolved in fluorobenzene (480.5 g, 5.0 mol) over a five to ten minutes period. The mixture was stirred at room temperature for one hour and then maintained at 70°–80° C. for four hours. After cooling, the reaction mixture was poured onto approximately 2000 g of ice containing 100 mL of concentrated hydrochloric acid. The resulting suspension was separated by decantation and washed several times with water. The organic layer was distilled to remove excess fluorobenzene and the solid residue collected by filtration, washed with water, and dried at 100° C. The crude solid was recrystallized from approximately 1000 mL of toluene to afford 130.5 g (81% yield) of 1,3-bis(4-fluorobenzoyl)-benzene; mp 177.5°–178.5° C.; ¹H NMR ($CDCl_3$) δ 6.8–8.13 (m, 12H, aromatic). Anal. Calcd. for $C_{20}H_{12}F_2O_2$: C, 74.53%; H, 3.75%; F, 11.79%. Found: C, 74.33%; H, 3.59%; F, 11.42%.

Representative difluoroketones are presented in Table 1.

TABLE 1

MELTING POINTS AND YIELDS OF DIFLUORO KETONES AND DIAMINES $$F-\bigcirc-\overset{O}{\underset{\|}{C}}-Ar-\overset{O}{\underset{\|}{C}}-\bigcirc-F \qquad H_2N-\bigcirc-O-\bigcirc-\overset{O}{\underset{\|}{C}}-Ar-\overset{O}{\underset{\|}{C}}-\bigcirc-O-\bigcirc-NH_2$$

| AR | M.P., °C. | YIELD, % | DESIGNATION | M.P., °C. | YIELD, % |
|---|---|---|---|---|---|
|  | 177.5–178.5 | 81[A] | 1,3-BABB | 161.5–164 | 58[C] |
|  | 218.5–219.5 | 88[A] | 1,4-BABB | 226–230 | 21[D] |
| 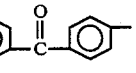 | 291–295 | 32[B] | 4,4'-BABBP | 227–231 | 65[D] |
| 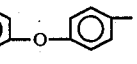 | 213–214 | 86[A] | 4,4'-BABDE | 205–206.5 | 60[D] |
|  | 258–260 | 70[B] | 2,6-BABN | 178–181 | 69[E] |

YIELDS AFTER RECRYSTALLIZATION FROM:
[A]TOLUENE; [B]DMF; [C]TOLUENE-ETHANOL; [D]PYRIDINE-METHANOL; [E]1,4-DIOXANE-METHANOL.

(B) 1,3-Bis(4-aminophenoxy)-4'-benzoyl)benzene: 4-Aminophenol (10.91 g, 0.100 mol) was dissolved in a solution of N,N-dimethylacetamide (75 mL) and toluene (75 mL) in a three-neck flask equipped with a Dean-Stark trap. Powdered anhydrous potassium carbonate (17.28 g, 0.125 mol) was added and water was removed by azeotropic distillation with toluene. Toluene was removed until the temperature reached 130°–140° C. Then 1,3-bis(4-fluorobenzoyl)benzene (16.12 g, 0.050 mol) was added and the reaction mixture stirred at 130°–140° C. overnight under a nitrogen atmosphere. The mixture was allowed to cool and subsequently added to water to precipitate a solid which was collected by filtration and dried. Two recrystallizations from 1:1 toluene-ethanol afforded 1,3-bis(4-aminophenoxy-4'-benzoyl)benzene (16.3 g, 58%) as a tan solid; mp 161.5°–164° C.; IR (KBr) 3445, 3370 cm$^{-1}$ (s, NH$_2$), 1639 cm$^{-1}$ (vs. sharp, C=O); $^1$H NMR (CDCl$_3$) δ 3.60 (s, 4H, NH$_2$), 6.3–8.3 (m, 20H, aromatic). Anal. Calcd for C$_{32}$H$_{24}$N$_2$O$_4$: C, 76.79%; H, 4.83%; N, 5.60%. Found: C, 76.62%; H, 5.11%; N, 5.28%.

Representative diamines are presented in Table 1.

Polyimide Synthesis 3,3',4,4'-Benzophenonetetracarboxylic acid dianhydride (6.4446 g, 0.0200 mol) was added in small portions over a period of one-half to one hour to a mechanically stirred solution of 1,3-bis(4-aminophenoxy-4'-benzoyl)benzene (10.0110 g, 0.0200 mol) dissolved in N,N-dimethylacetamide (99.5 mL), which was maintained under a nitrogen atmosphere at room temperature. The poly(amic acid) solution (15% solids, w/w) was stirred overnight and the inherent viscosity at 0.5% concentration in N,N-dimethylacetamide was subsequently determined to be 0.81 dL/g at 35° C. The polyamic acid solution was centrifuged, the decantate cast onto plate glass using a doctor blade, and dried to a tack-free form in a dust-free chamber. The film on glass was then thermally converted to the polyimide by heating in air at 100°, 200°, and 300° C. for one hour at each temperature. The resulting yellow polyimide film (approximately 2.3 mils thick) was determined by differential scanning calorimetry to have a glass transition temperature at 222° C. and a strong crystalline melt transition at 350° C. Quenching a sample of this film after heating it to 375° C. reduced the amount of crystallinity as evidenced by the differential scanning calorimetry curve of the quenched film exhibiting a well-defined glass transition at 222° C. followed by a weak crystalline melt transition at 354° C. Annealing the quenched film at 300° C. for 45 minutes resulted in regaining some degree of crystallinity as indicated by an increase in the intensity of crystalline melt transition. The film as cured on glass was determined by wide angle x-ray diffraction to be semi-crystalline. Tensile strength, tensile modulus, and elongation at break of this film were determined to be 19,400 psi, 513,000 psi, and 6.5%, respectively at 25° C. Specimens of this film placed under stress were unaffected after 72 hours immersion in solvents which included JP-4 (jet fuel), ethylene glycol (deicing fluid), tricresyl phosphate (hydraulic fluid), chloroform and N,N-dimethylacetamide. Film specimens were also unaffected by immersion for 18 hours in strong bases such as 30% aqueous sodium hydroxide and 100% hydrazine hydrate. The polyimide was ground to a powdered form and molded in a 1.25 inch square stainless steel mold at 400° C. under 2000 psi. The fracture toughness or critical strain energy release rate ($G_{Ic}$) as obtained on miniature compact tension specimens were determined to be 37.8 in-lb/in$^2$. The failed fracture surfaces of the specimens were very rough, indicative of a fracture mechanism that absorbs energy by distributing it over a large surface area with yielding in contrast to stable crack growth characteristic of brittle materials. Titanium to titanium tensile shear specimens were fabricated at 400° C. under 2000 psi. Tensile shear strength was 6200 psi at 25° C., 3900 psi at 177° C., and 880 psi at 232° C. Test specimens annealed for five hours at 300° C. gave strengths of 5730 psi at 25° C. and 2560 psi at 232° C. Failures were predominantly cohesive. By thermogravimetric analysis this polyimide exhibited 5% weight loss at 525° C. in nitrogen and at 488° C. in flowing air.

The chemical structure, inherent viscosity of the precursor polyamide acid, glass transition temperature and crystalline melt temperature of representative polyimides containing carbonyl and ether connecting groups are presented in Tables 2 and 3.

TABLE 2
POLYIMIDES CONTAINING CARBONYL AND ETHER CONNECTING GROUPS

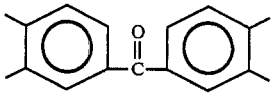

| Ar' | Ar | Polyamide acid $\eta_{inh}$, dL/g | Polyimide $T_g$, °C | Polyimide $T_m$, °C |
|---|---|---|---|---|
|  |  | 0.81 | 222 | 350 |
| ↓ | 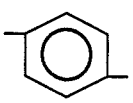 | 0.62 | 233 | 427 |
| ↓ |  | 0.57 | 233 | 422 |
| ↓ | 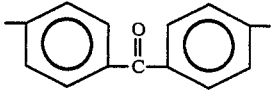 | 0.52 | 215 | 418 |
| ↓ |  | 0.42 | 246 | 424 |

TABLE 3
POLYIMIDES CONTAINING CARBONYL AND ETHER CONNECTING GROUPS

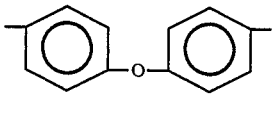

| Ar' | Ar | Polyamide acid $\eta_{inh}$, dL/g | Polyimide $T_g$, °C | Polyimide $T_m$, °C |
|---|---|---|---|---|
| 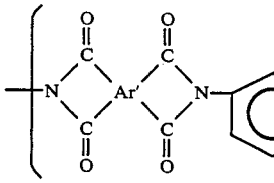 | 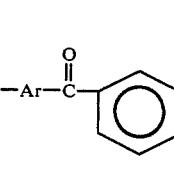 | 0.83 | ND | ND |
| 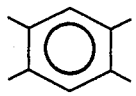 | 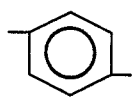 | 1.30 | 247 | 442 |

TABLE 3-continued
POLYIMIDES CONTAINING CARBONYL AND ETHER CONNECTING GROUPS

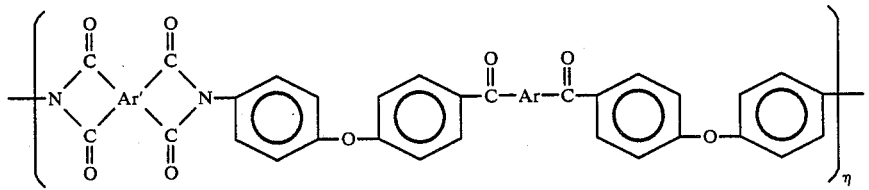

| Ar' | Ar | Polyamide acid $\eta_{inh}$, dL/g | Polyimide $T_g$, °C. | Polyimide $T_m$, °C. |
|---|---|---|---|---|
| (diphenyl ether) | ↓ | 0.65 | 208 | ND |
| (bis(phenoxyphenyl) sulfide) | ↓ | 0.77 | 192 | ND |
| (dimethylsilyl diphenyl) | ↓ | 1.10 | 208 | ND |
| (biphenyl) | ↓ | 1.25 | 222 | ND |

ND = Not Detected

What is claimed as new and desired to be secured by Letters Patent of the United States is:

1. A high molecular weight linear polyimide having high strength, modulus, toughness, and solvent resistance, the polyimide having the general structural formula:

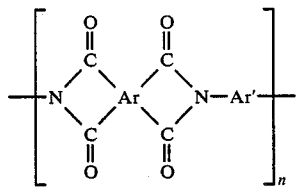

(a) wherein Ar is a radical selected from the group consisting of:

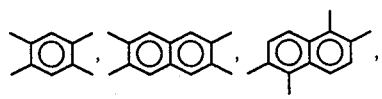

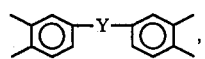

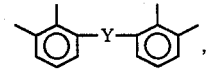

-continued

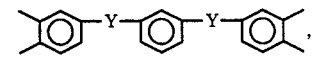

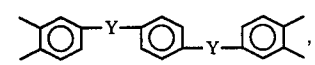

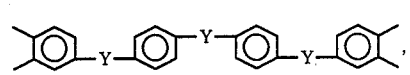

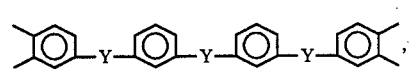

wherein Y is not a substituent or is a substituent selected from the group consisting of:

O, S,

$SO_2$, $CH_2$, $C(CH_3)_2$, $C(CF_3)_2$ and $Si(CH_3)_2$;

(b) wherein Ar' is a radical having the structural formula:

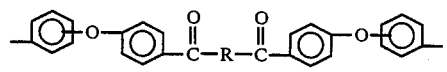

wherein R is a radical selected from the group consisting of:

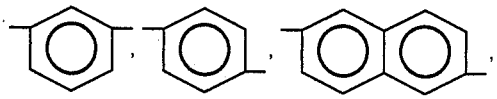

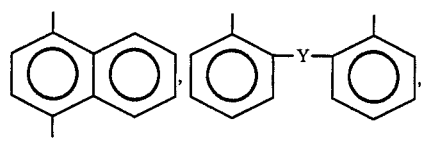

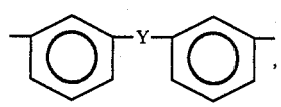

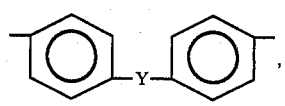

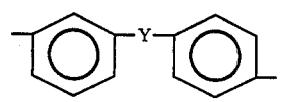

wherein Y is not a substituent or is a substituent selected from the group consisting of:
O, S,

$SO_2$, $CH_2$, $C(CH_3)_2$, and $C(CF_3)_2$,
and mixtures thereof; and
(c) wherein n is an integer between 4 and 100.

2. A diamine having the general structural formula:

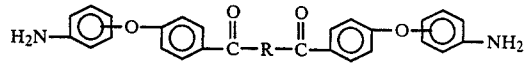

wherein R is a radical selected from the group consisting of:

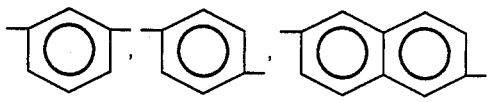

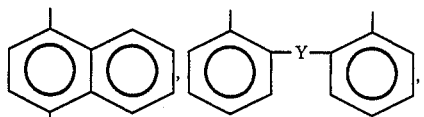

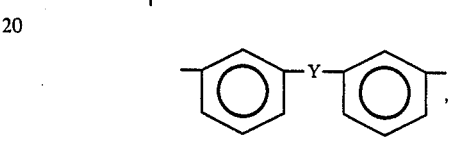

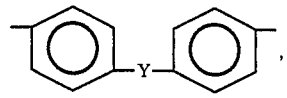

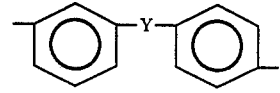

wherein Y is not a substituent or is a substituent selected from the group consisting of:
O, S,

$SO_2$, $CH_2$, $C(CH_3)_2$, and $C(CF_3)_2$.

3. A film from a semi-crystalline polyimide according to claim 1 which is unaffected by immersion in a strong base for up to 18 hours.

* * * * *